US012811078B2

(12) United States Patent
Beltan et al.

(10) Patent No.: US 12,811,078 B2
(45) Date of Patent: Nov. 24, 2026

(54) BI-DIRECTIONAL DOUBLE-BREAK CONTACTOR

(71) Applicant: SAFRAN ELECTRICAL & POWER, Blagnac (FR)

(72) Inventors: Cecil Beltan, Moissy Cramayel (FR); Guillaume Prieur, Moissy Cramayel (FR); Arnaud Badault, Moissy Cramayel (FR); Kévin Enouf, Moissy Cramayel (FR); Alexis Schach, Moissy Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 312 days.

(21) Appl. No.: 18/682,683

(22) PCT Filed: Jul. 29, 2022

(86) PCT No.: PCT/FR2022/051527
§ 371 (c)(1),
(2) Date: Feb. 9, 2024

(87) PCT Pub. No.: WO2023/017220
PCT Pub. Date: Feb. 16, 2023

(65) Prior Publication Data

US 2024/0363296 A1 Oct. 31, 2024

(30) Foreign Application Priority Data

Aug. 11, 2021 (FR) .......................................... 2108642

(51) Int. Cl.
*H01H 33/18* (2006.01)

(52) U.S. Cl.
CPC .................................. *H01H 33/18* (2013.01)

(58) Field of Classification Search
CPC ............ H01H 1/20; H01H 9/346; H01H 9/36; H01H 9/443; H01H 9/345; H01H 9/44;
(Continued)

(56) References Cited

U.S. PATENT DOCUMENTS 4,011,425 A * 3/1977 Gryctko .................. H01H 9/36 218/15
7,417,520 B2 * 8/2008 Kralik ...................... H01H 9/44 200/10

(Continued)

FOREIGN PATENT DOCUMENTS

EP 2 463 876 A1 6/2012
EP 2 743 950 A1 6/2014
WO WO 2011/147458 A1 12/2011

OTHER PUBLICATIONS

ER International Search Report as issued in International Patent Application No. PCT/FR2022/051527, dated Oct. 5, 2022.

*Primary Examiner* — William A Bolton
(74) *Attorney, Agent, or Firm* — CUSHMAN PARTNERS LLC

(57) ABSTRACT

A contactor includes a bridge which is movable between a closed state and an open state, including movable contacts; two fixed contacts facing the movable contacts, wherein in the closed state the movable contacts are in contact with the fixed contacts and in the open state the movable contacts are spaced apart from the fixed contacts; two magnets generating a magnetic field and generating a magnetic force in order to move an arc appearing between the fixed contacts and the movable contacts passing from a closed state to an open state; two fin blocks; and two pairs of arc guides, each being directed from the movable contacts to each of the two fin blocks, wherein at least fin slots forming a groove of the fin blocks face each guide of a pair of arc guides.

9 Claims, 4 Drawing Sheets

(58) Field of Classification Search

CPC .... H01H 9/46; H01H 9/446; H01H 2009/365; H01H 33/18; H01H 33/182

USPC ......... 218/22–24, 26–27, 30–31, 34, 36, 38, 40, 218/43, 47; 335/201, 202

See application file for complete search history.

(56) References Cited

U.S. PATENT DOCUMENTS

| | | | | |
|---|---|---|---|---|
| 7,915,985 | B2 * | 3/2011 | Schmitz | H01H 9/443 335/201 |
| 8,368,492 | B1 * | 2/2013 | Theisen | H01H 9/46 218/15 |
| 9,431,197 | B2 * | 8/2016 | Engewald | H01H 33/182 |
| 9,991,073 | B2 * | 6/2018 | Kralik | H01H 33/182 |
| 10,176,945 | B2 * | 1/2019 | Domejean | H01H 77/108 |
| 2014/0319099 | A1 * | 10/2014 | Baujan | H01H 33/08 218/41 |
| 2019/0326083 | A1 * | 10/2019 | Strand | H01H 33/14 |

* cited by examiner

[Fig. 1]
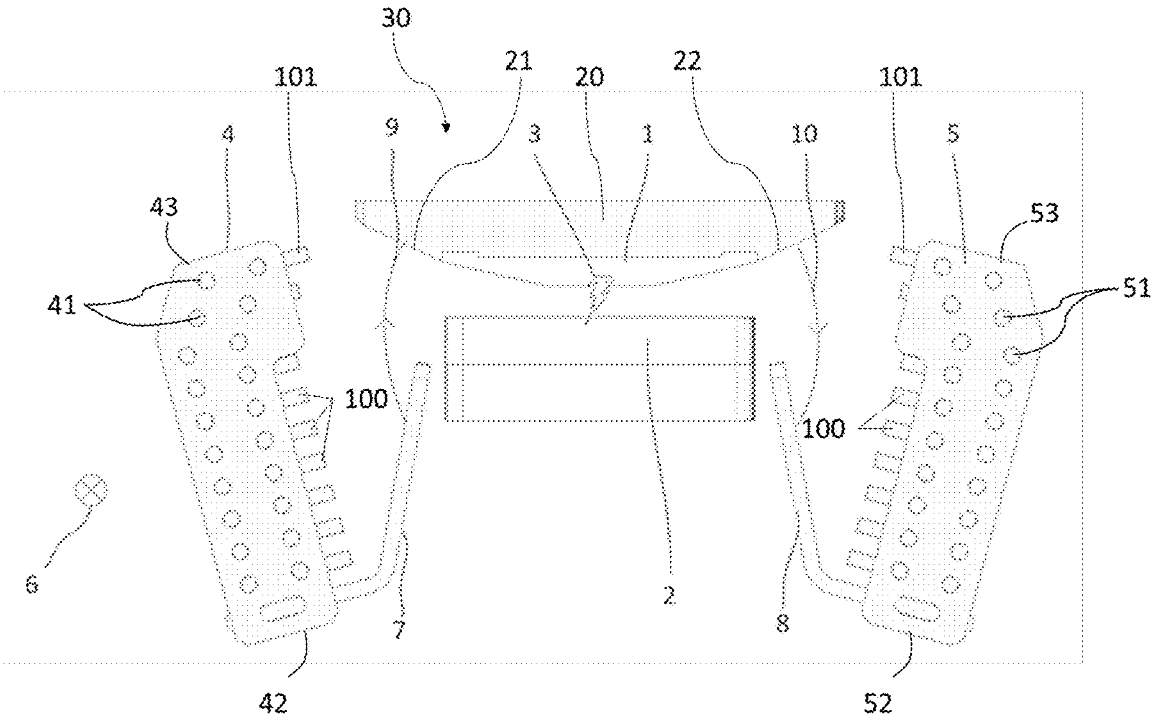
[Fig. 2]
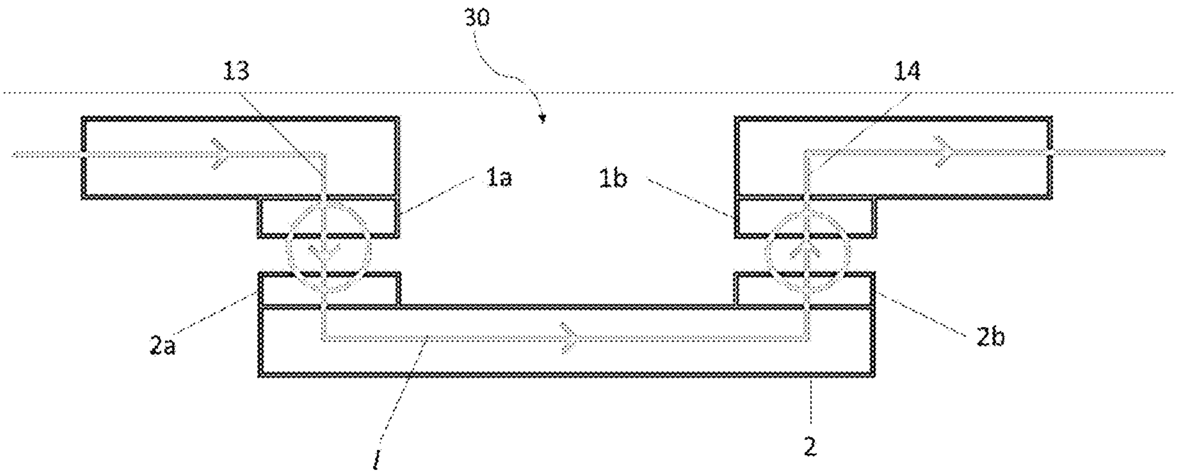

[Fig.3]
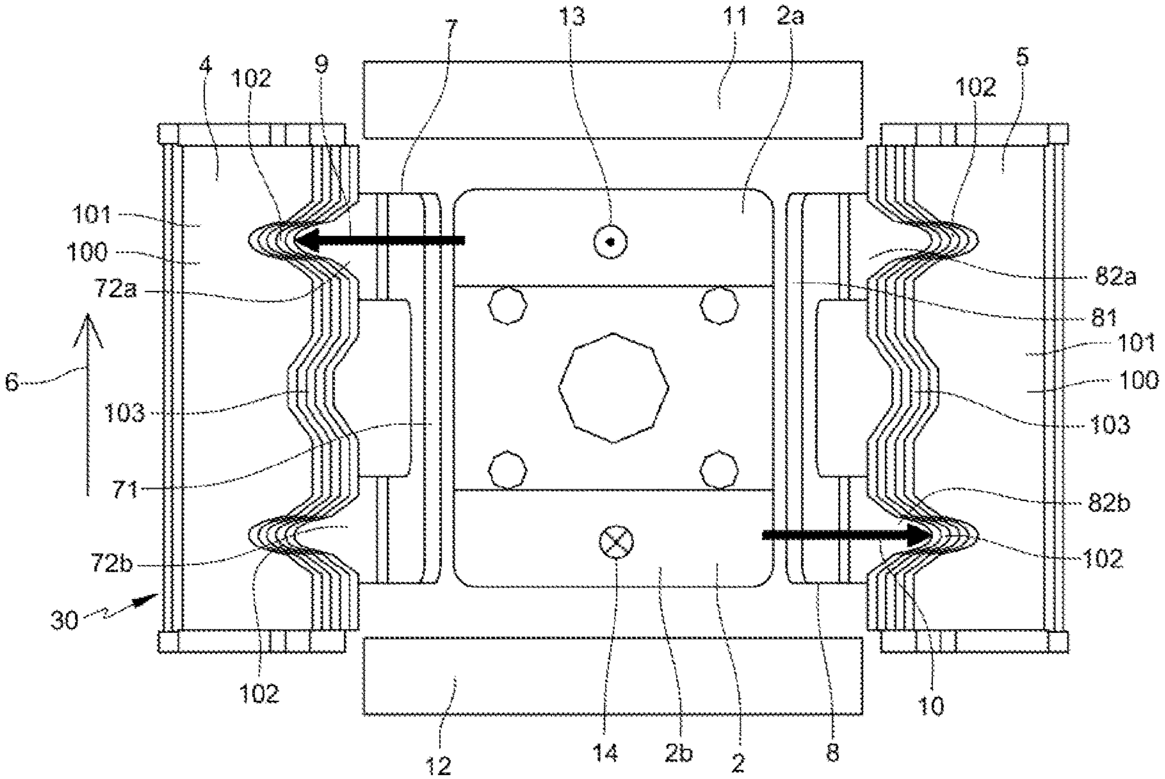
[Fig.4]
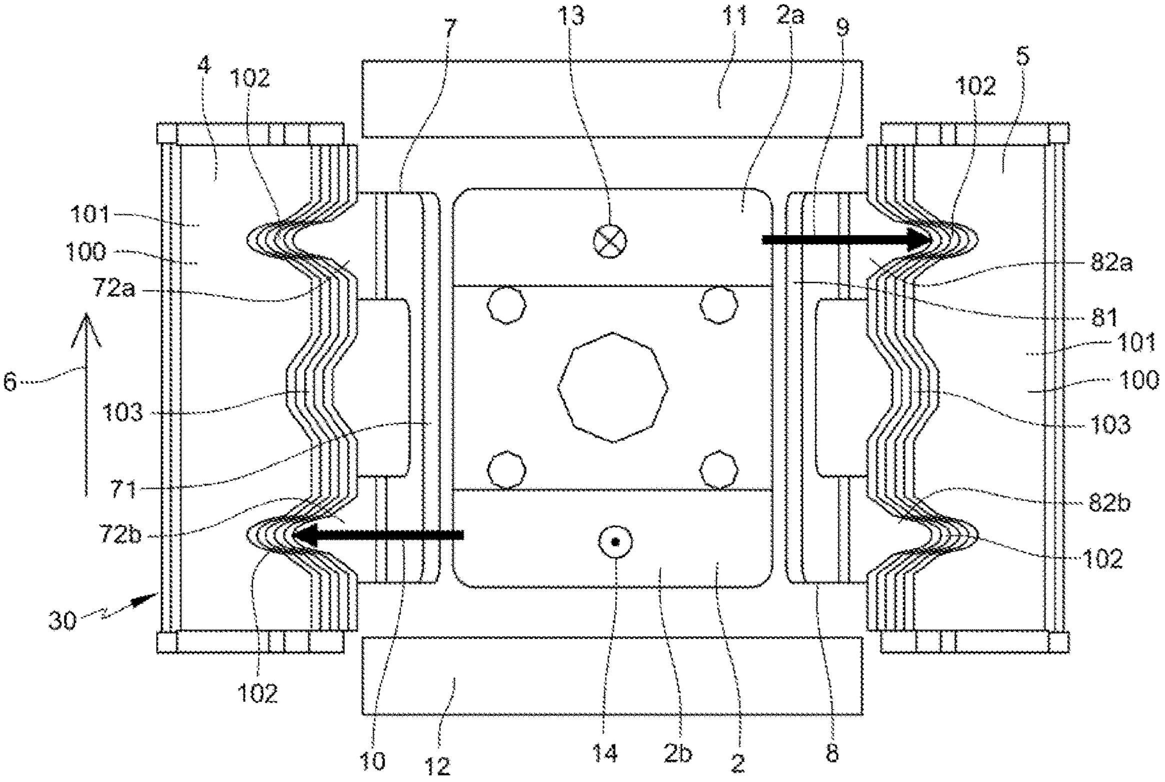

[Fig.5]
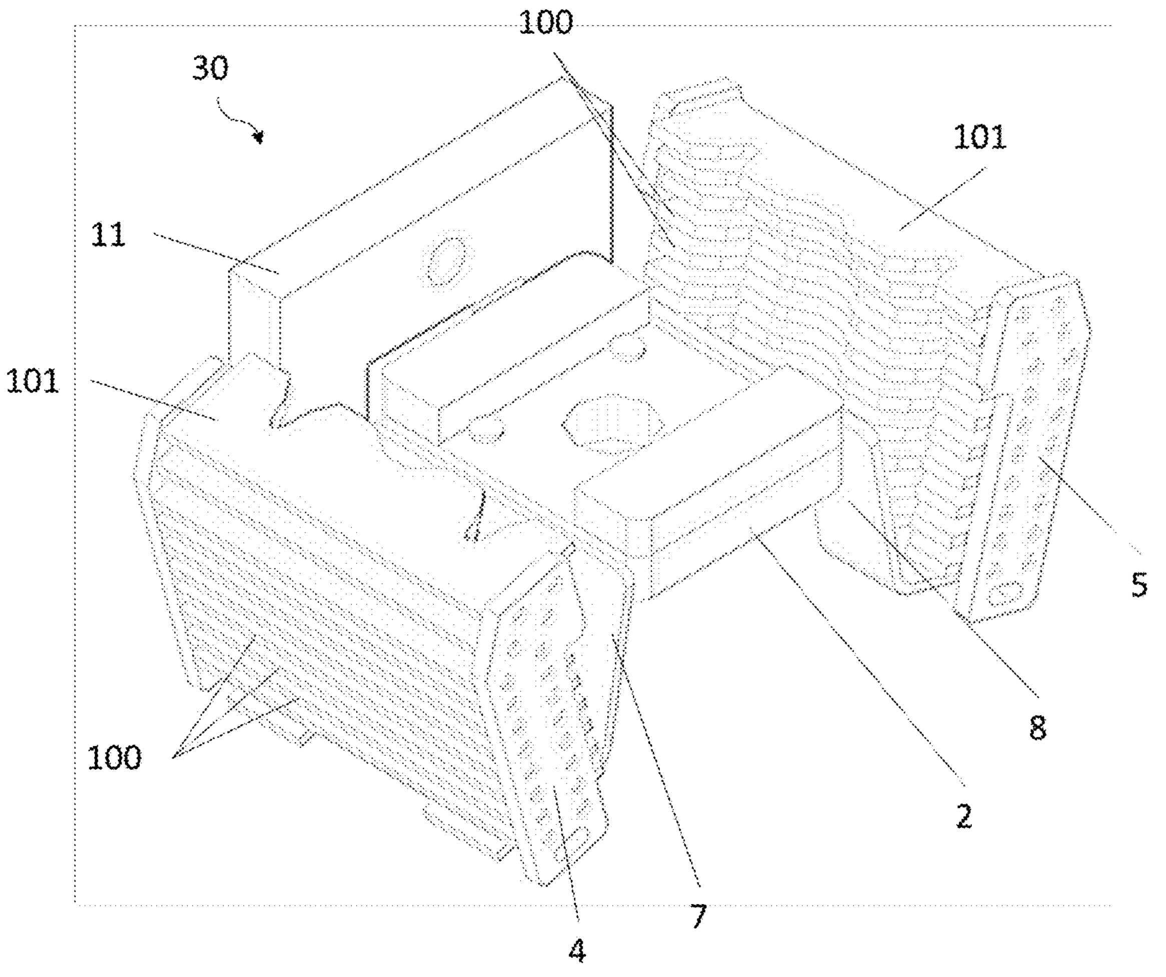

[Fig.6]
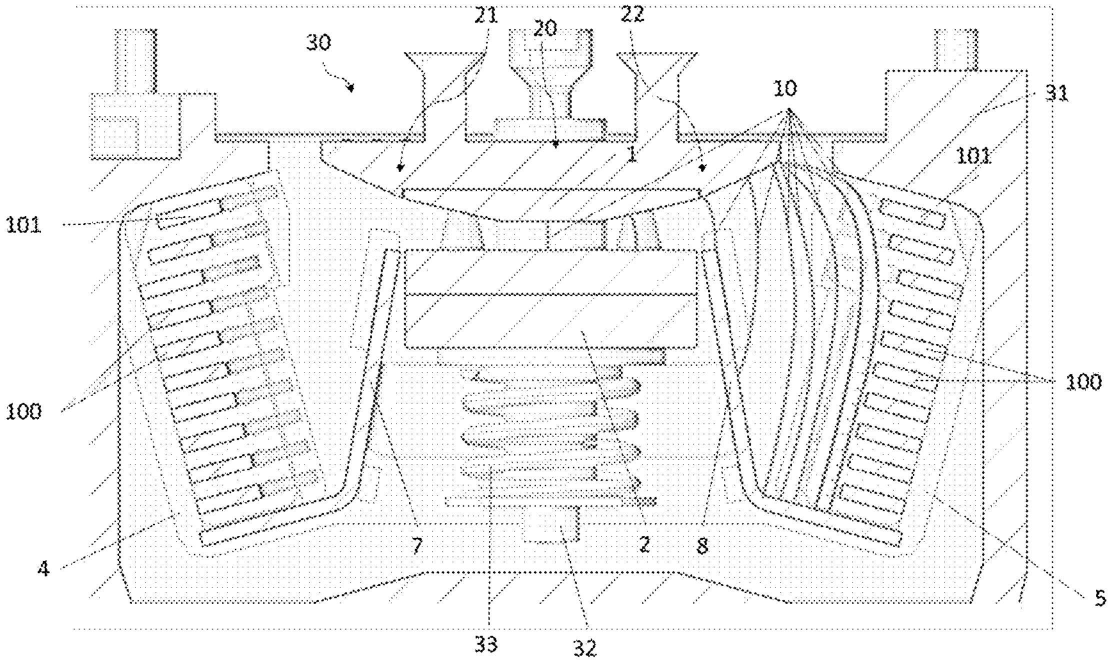
[Fig.7]
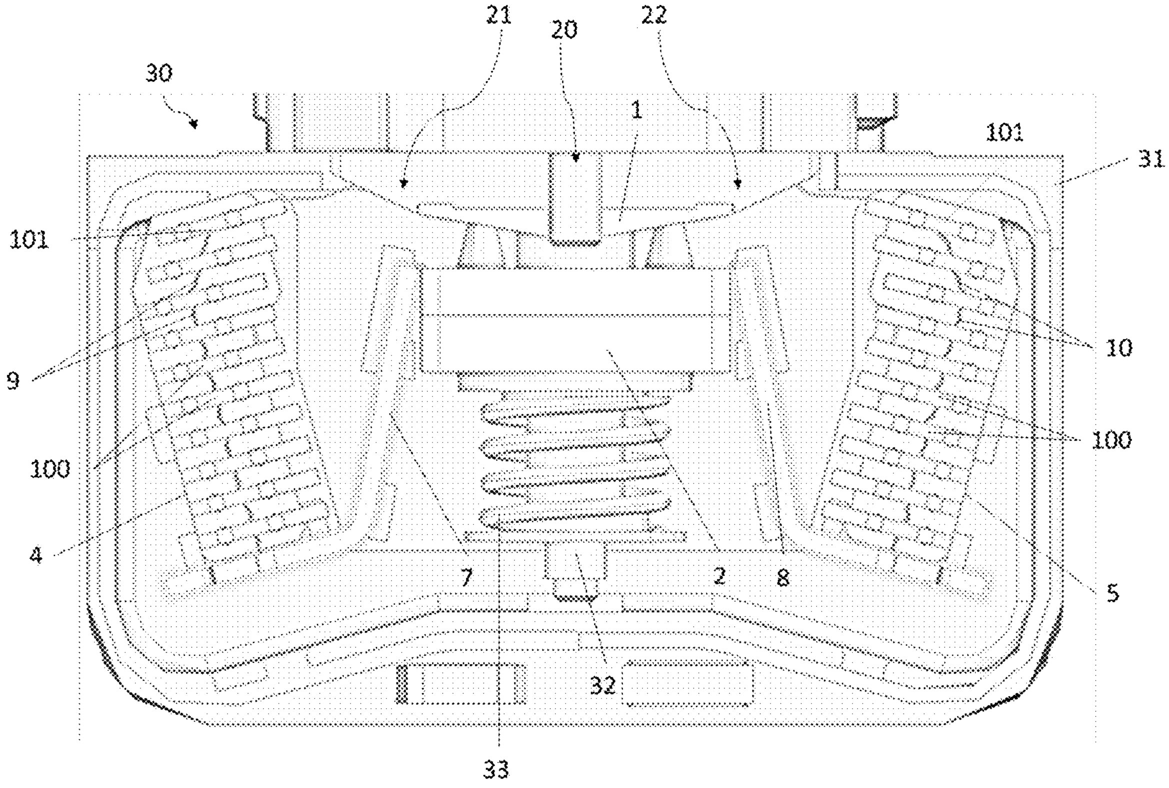

BI-DIRECTIONAL DOUBLE-BREAK CONTACTOR

CROSS-REFERENCE TO RELATED APPLICATIONS

This application is the U.S. National Stage of PCT/FR2022/051527, filed Jul. 29, 2022, which in turn claims priority to French patent application number 2108642 filed Aug. 11, 2021. The content of these applications are incorporated herein by reference in their entireties.

TECHNICAL FIELD OF THE INVENTION

The technical field of the invention is that of contactor chambers.

The present invention relates to a bi-directional double-break contactor and more particularly to a bi-directional double-break contactor including a total of two fin blocks enabling two electric arcs to be extinguished simultaneously.

TECHNOLOGICAL BACKGROUND OF THE INVENTION

Switches are generally provided with two electrical contacts for establishing an electrically conductive connection. When the contacts are separated, electric arcs occur, which are accompanied by high thermal stress and difficulty in extinguishing the electrical connection. These arcs must therefore be extinguished quickly.

Conventionally, arcs are extinguished by accelerating the arc with a magnetic field in the direction of deionisation fins, for sectioning the electric arc into several arcs. Sectioning the arc makes it possible to increase arc voltage and thus extinguish it.

For example, patent EP 2463876A1 sets forth an invention for sectioning electric arcs in a bi-directional double-break contactor. This is comprised of two extinction zones per break zone, that is four extinction zones in this contactor. For each break zone, the two extinction zones are distinct and perpendicular to each other. In one embodiment, each of the extinction zones comprises a fin bock, that is four fin bocks. In another embodiment, for each break zone, the contactor comprises an extinction zone which is a fin block and the other extinction zone is an arc spacer plate. In addition, for each fin block, there are two arc guides per fin block, each extending from an electrical contact of the corresponding switch, and one arc guide extending from each arc spacer plate. However, this solution is cumbersome and requires many equipment because of the two distinct extinction zones perpendicular to each other per break zone.

SUMMARY OF THE INVENTION

The invention offers a solution to the problems previously discussed, by making it possible to increase dissipation power of the deionisation fins while simplifying operation of the contactor by reducing the number of parts inside the contactor. This simplification makes it possible to reduce the number of parts and thus increase surface area of the fins to help dissipate electric arcs.

A first aspect of the invention relates to a bi-directional double-break contactor comprising:

- a movable bridge being movable between a closed state and an open state, comprising a first movable contact and a second movable contact, and,
- a first fixed contact facing the movable contact and
- a second fixed contact facing the movable contact, wherein, in the closed state, the first and second movable contacts are in contact with the first and second fixed contacts respectively and, in the open state, the first and second movable contacts are distant from the first and second fixed contacts respectively,

- two magnets capable of generating a magnetic field having constant direction so as to generate a magnetic force to move an arc appearing between the fixed contacts, and the movable contacts of the movable bridge switching from a closed state to an open state,
- two fin blocks each having:
  - a first and a second end
  - fins between the first end and the second end of the corresponding fin block,
  - a first and a second extinction zone each formed by the fins,
- four arc guides running from the movable contacts of the bridge to the two fin blocks, characterised in that at least fin notches forming a groove of fin blocks among the fins of each of the two fin blocks are facing each corresponding arc guide.

The invention thus makes it possible to reduce the number of parts in the contactor by using one fin block for two extinction zones. In addition, having a single fin block without a second extinction zone (either a fin block or an arc spacer plate) that is separate and perpendicular to this fin block makes it possible to take advantage of an increase in fin surface area and to increase inter-fin volume. The increase in fin surface area improves heat dissipation and therefore reduces contactor heating. The inter-fin volume in the fin blocks makes it possible to increase dissipation power of the deionisation fins by reducing, and perhaps even eliminating, blow-out of the arcs to be sectioned.

In addition to the characteristics just discussed in the preceding paragraph, the contactor according to one aspect of the invention may have one or several additional characteristics from among those mentioned in the following paragraphs, considered individually or according to any technically possible combinations:

According to one embodiment, the bi-directional double-break contactor comprises four arc guides each running from one of the corresponding fixed contacts towards one of the corresponding fin blocks respectively. Each fin block therefore faces four arc guides and the number of arc guides is therefore eight:

- the four arc guides running from the movable bridge contacts make it possible to guide the arc from the movable bridge to the fin blocks
- the other four arc guides running from the fixed contacts make it possible to guide the arc from the fixed contacts to the fin blocks.

According to one example of this embodiment, the eight arc guides are independent of each other, four arc guides are branches extending from the movable contacts towards the fin blocks and four arc guides are branches extending from the fixed contacts towards the fin blocks.

According to one example of this embodiment, the bi-directional double-break contactor comprises a first and a second fixed contact support electrically insulated from each other respectively supporting the first and second fixed contact, and two of the four arc guides running from the fixed contacts belong to the first fixed contact support each extending from the first fixed contact towards the fin blocks, and the other two of the four arc guides running from the fixed contacts belong to the second fixed contact support each extending from the second fixed contact towards the fin blocks. For example, these four arc guides running from the fixed contacts are surfaces of the first and second fixed contact supports running from the fixed contacts to the fin blocks.

According to one example of this embodiment, the four arc guides running from the fixed contacts are surfaces of the first and second fixed contact supports running from the fixed contacts to the fin blocks.

According to one embodiment, one pair of arc guides among the four arc guides running from the movable contacts, is a plate comprising a first and a second arc guide bonded to a base, the first and second arc guide each extending in a direction between respectively the first and second movable contacts of the bridge towards the corresponding fin block. Thus, the branches allow the arc to be guided from the movable bridge towards the corresponding fin blocks.

According to one example of this embodiment, the two arc guides of a pair of arc guides are separated from each other by a groove and are parallel to each other.

According to one example of this embodiment, the fins of each fin block each comprise two portions of the two distinct extinction zones of the corresponding fin block, each of the two portions comprising a groove and in that for each of the pairs of arc guides, the arc guides extend from the base of the arc guide plate towards the grooves of the fin blocks. The grooves of the fin blocks make it possible to guide the arc onto the fin block.

According to one embodiment, four arc guides running from the movable contacts are joined into an assembly, the assembly is a plate comprising four arc guides bonded to a base, each arc guide extends from the movable contacts towards the fin blocks. This simplifies assembly by having a single part.

According to one embodiment, the fins of each fin block each comprise a receiving surface and in that some of the receiving surfaces are offset towards the fixed contact relative to the other receiving surfaces aligned in a same plane of the same fin block. This makes it possible to snugly fit the arc as it propagates from the first and second movable contacts to the fin block.

According to one embodiment, each arc guide is fixed to the first end of the fin block.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 is a schematic diagram of the break chamber of a contactor according to one embodiment of the invention.

FIG. 2 is a schematic diagram of the double electrical contacts of the double-break contactor.

FIG. 3 is a top view of a part of the break chamber represented in FIG. 1 along a current flow.

FIG. 4 is a top view of a part of the break chamber represented in FIG. 1 along a current flow.

FIG. 5 is a perspective view of a part of the break chamber represented in FIG. 1.

FIG. 6 is a cross-sectional view of a part of the contactor comprising the break chamber represented in FIG. 1 with electric arcs.

FIG. 7 is a cross-sectional view of a part of the contactor comprising the break chamber represented in FIG. 1 with electric arcs sectioned by fins.

DETAILED DESCRIPTION

Unless otherwise specified, a same element appearing in different figures has a single reference.

The invention relates to a bi-directional double-break contactor.

With reference to FIG. 2, which is a schematic diagram of the double electrical contacts of the bi-directional double-break contactor, the bi-directional double-break contactor comprises a movable bridge 2 comprising a first movable contact 2*a*, a second movable contact 2*b*, a first fixed contact 1*a* and a second fixed contact 1*b*. The movable contact 2*a* faces the first fixed contact 1*a* and the second movable contact 2*b* faces the second fixed contact 1*b*. FIG. 2 represents the movable bridge 2 in the open state. When the movable bridge 2 is in the closed state, a current I flows from the first fixed contact 1*a* through the movable bridge 2 to the second fixed contact 1*b*. Current I therefore flows in a first electric current direction from the first fixed contact 1*a* to the second fixed contact 1*b* and therefore flows in a first physical direction 13 when the current flows between the first fixed contact 1*a* and the movable contact 2*a* and a second physical direction 14 opposite to the first physical direction 13 when the current flows between the second fixed contact 1*b* and the movable contact 2*b*. The electrical flow of the current I can be reversed in such a way that the current I moves from the second fixed contact 1*b* towards the first fixed contact 1*a* by crossing the movable bridge 2, the direction of the physical current is therefore reversed at the contacts 1*a*, 2*a*, 1*b*, 2*b*.

With reference to FIG. 1, a bi-directional double-break contactor 30 is represented according to a first embodiment of the invention. The contactor 30 comprises a break chamber, the movable bridge 2 located in the break chamber and the first fixed contact 1*a* and the second fixed contact 1*b*, together referred to as the fixed contacts 1, only one of which is represented in FIG. 1. The fixed contacts 1 are also located in the break chamber facing the movable bridge 2. The movable bridge 2 is either in a closed state when the movable bridge 2 is in contact with the fixed contacts 1, or in an open state when the movable bridge 2 is distant (separated) from the fixed contacts 1. The contactor 30 comprises a first and a second fin block 4, 5 each comprising a first end 42, 52 and a second end 43, 53 opposite to the first end 42, 52. The second end 43, 53 is the end closest to the fixed contacts 1. A first pair of arc guides 7 is fixed to the first end 42 of the first fin block 4 and a second pair of arc guides 8 is fixed to the first end 52 of the second fin block 5. Each pair of arc guides 7, 8 comprises two arc guides 72*a*, 72*b*, 82*a*, 82*b*.

In this embodiment, the bi-directional double-break contactor 30 comprises first and second fixed contact supports 20 that are electrically insulated from each other, the first and second fixed contact supports 20 each supporting the first fixed contact 1*a* and the second fixed contact 1*b* respectively.

In this embodiment, the bi-directional double-break contactor comprises a first and a second pair of arc guides 21, 22 running from the first fixed contact 1*a* and the second fixed contact 1*b* to the first fin block 4 and the second fin block 5 respectively.

In this example of this embodiment, the first and second fixed contact supports 20 each comprise two of the four arc guides 21, 22. In FIG. 1, only one fixed contact support of the first and second fixed contact supports 20 is represented and two of the four arc guides 21, 22 are represented. According to one example, the contactor 30 includes a support block comprising the two fixed contact supports 20 for the two fixed contacts 1 by including an electrically insulating part between the two fixed contact supports 20.

FIG. 1 represents two arc guides 21, 22. Each arc guide 21, 22 of the fixed contact 1 being a surface of a fixed contact support 20.

The fin blocks 4, 5 are comprised of a plurality of fins 100 stacked and distant from each other. Each fin 100 of each fin block 4, 5 comprises a receiving surface in such a way that some of the receiving surfaces are offset towards the fixed contacts 1 with respect to the other receiving surfaces of a same fin block, aligned in the same plane. This offset forms a curve for snugly fitting the arcs 9, 10 formed by the fixed contacts 1 and the movable bridge 2 at best.

FIG. 1 represents the movable bridge 2 in the open state. When the movable bridge 2 switches from the closed state to the open state, two electric arcs 9, 10 can be created between the fixed contacts 1 and the movable bridge 2. These move towards the fin blocks 4, 5. The arcs 9, 10 have two hooking points called arc legs. At the movable bridge 2, the arc legs move over the movable contacts 2a and 2b and then over the arc guides 72a, 72b, 82a, 82b. The arc guides 72a, 72b, 82a, 82b at the movable bridge 2 are branches. At the fixed contact 1, the arc legs move over the fixed contacts 1a, 1b and then over the four arc guides 21, 22 belonging to the first and second fixed contact supports 20.

In another embodiment not represented, the contactor 30 comprises eight arc guides 72a, 72b, 82a, 82b, 21, 22 independent of each other. The arc guides 72a, 72b, 82a, 82b, 21, 22 are therefore not bonded as a pair of arc guides 7, 8.

In the embodiment represented in the figures, one of the fins 100 of each fin block 4, 5 is an input fin 101 located at the second end 43, 53 of the fin blocks 4, 5. With reference to FIG. 5, the fins 100 are identical in shape. The input fin 101 is the fin closest to the fixed contacts 1. The input fin 101 is the fin most offset towards the fixed contact with respect to the other fins 100.

With reference to FIG. 3, which is a view of a part of the break chamber of the contactor 30 of FIG. 1 without the fixed contacts 1, the pairs of arc guides 7, 8 are each formed by a base 71, 81 and two arc guides 72a, 72b, 82a, 82b bonded to the base 71, 81. The arc guides 72a, 72b, 82a, 82b are herein branch-shaped. The arc guides 72a, 72b of the first pair of arc guides 7 are fixed to the first end 42 of the first fin block 4. The arc guides 82a, 82b of the second pair of arc guides 8 are fixed to the first end 52 of the second fin block 5. The movable bridge 2 is located between the two bases 71, 81. Preferably, a length of the movable bridge 2 located facing the bases 71, 81 is substantially identical to a length of each base 71, 81. The first pair of arc guides 7 comprises a first arc guide 72a and a second arc guide 72b. The first arc guide 72a of the first pair of arc guides 7 faces the first movable contact 2a. The second arc guide 72b of the first pair of arc guides 7 faces the second movable contact 2b. Hence, the second pair of arc guides 8 comprises a first arc guide 82a and a second arc guide 82b. The first arc guide 82a of the second pair of arc guides 8 faces the first movable contact 2a. The second arc guide 82b of the second pair of arc guides 8 faces the second movable contact 2b. The pairs of arc guides 7, 8 make it possible to create a hooking point for the arc legs in order to create a path for them to travel towards the fin blocks.

In another embodiment not represented, the pairs of arc guides 7, 8 are two plates having a length substantially identical to the length of the movable bridge 2. The first and second pairs of arc guides 7, 8 are facing the movable bridge 2 and more precisely facing the first and second movable contacts 2a, 2b respectively. The first and second pairs of arc guides 7, 8 extend from the movable bridge 2 towards the first fin block 4 and the second fin block 5 respectively. The first 7 and second 8 pair of arc guides are fixed to the first fin block 4 and second fin block 5 respectively.

In another embodiment not represented, the contactor 30 comprises a set of four arc guides connecting the arc guides 72a, 72b, 82a, 82b instead of two pairs of arc guides 7, 8 in the embodiment represented. At the movable bridge 2, the assembly comprises a base from which the four arc guides 72a, 72b, 82a, 82b extend towards the fin blocks 4, 5. The arc guides 72a, 72b, 82a, 82b are herein branch-shaped.

The contactor 30 comprises two magnets 11, 12, each with two polarities (north and south), with the movable bridge 2 located between the two magnets 11, 12. The first magnet 11 has a south pole facing the movable bridge 2. The second magnet 12 has a north pole facing the mobile bridge 2. The two magnets 11, 12 thus generate a magnetic field having constant direction from a first magnet 12 to a second magnet 11. The direction of the magnetic field is represented by arrow 6.

The magnetic field forces the electric arcs 9, 10 to move towards the fin blocks 4, 5 according to Laplace's law.

Thus, $$d\vec{F} = I \cdot d\vec{l} \wedge \vec{B} \qquad \text{[Math. 1]}$$

With $\vec{F}$, the force applied to the electric arc 9, 10, I the current passing through the electric arc 9, 10, $\vec{l}$ the length element of the electric arc 9, 10 through which the current I passes and $\vec{B}$ the magnetic field to which it is subjected.

Thus, FIG. 3 shows a flow of current I, such that the first physical direction 13 flows from the first fixed contact 1a to the first movable contact 2a and the second physical direction 14 flows from the second movable contact 2b to a second fixed contact 1b.

In this configuration, a first electric arc 9 propagates from the first movable contact 2a and is moved by a magnetic force generated by the magnetic field towards the first fin block 4. The first electric arc 9 is guided by the first arc guide 72a of the first pair of arc guides 7 towards the first fin block 4.

In the same configuration, a second electric arc 10 propagates from the second movable contact 2b and is moved by a magnetic force generated by the magnetic field towards the second fin block 5. The second arc 10 is guided by the second arc guide 82b of the second pair of arc guides 8 towards the second fin block 5.

With reference to FIG. 4, which is a view of FIG. 3, the current I flows in a second electric current direction from the second fixed contact 1b to the first fixed contact 1a. The second electric current direction is reversed with respect to the first electric current direction in FIG. 3. The first physical direction 13 therefore flows from the first movable contact 2a to the first fixed contact 1a and the second physical direction 14 flows from the second fixed contact 1b to the second movable contact 2b.

In this configuration, the first electric arc 9 propagates from the first movable contact 2a and moves by a magnetic force generated by a magnetic field towards the second fin block 5. The first electric arc 9 is guided by the first arc guide 82*a* of the second pair of arc guides 8 towards the second fin block 5.

In this same configuration, the second electric arc 10 propagates from the second movable contact 2*b* and moves by a magnetic force generated by a magnetic field towards the first fin block 4. The second arc 10 is guided by the second arc guide 72*b* of the first pair of arc guides 7 towards the first fin block 4.

Each fin block 4, 5 includes a first and a second groove 102 located along the fins 100. Each fin 100 therefore comprises two notches on either side such that the notches on one side of the fins of a fin block 4, 5 together form a first groove 102 and the other notches on the other side of the fins 100 of a fin block 4, 5 form the second groove 102. The first and second grooves 102 in the first fin block 4 each include a bottom located facing the first and second arc guides 72*a*, 72*b* respectively of the first pair of arc guides 7, thus enabling the electric arcs 9, 10 to be guided. The first and second grooves 102 in the second fin block 5 each include a bottom located facing the first and second arc guides 82*a*, 82*b* of the second pair of arc guides 8. The grooves 102 make it possible to predetermine the exact place where the electric arc 9, 10 will be guided and contained in order to be extinguished.

Each groove 102 is V-shaped, each groove 102 can also be U-shaped or in any other shape that allows the arcs 9, 10 to be properly guided.

Each fin block 4, 5 comprises a recess 103 positioned between the two grooves 102 of the fin block 4, 5. This recess 103 makes it possible to reduce mass of the contactor 30.

FIG. 6 represents a cross-sectional view of a break chamber of the contactor 30 represented with a plurality of arcs corresponding to the displacement of the second arc 10 moving from the movable bridge 2 through the second pair of arc guides 8 towards the second fin block 5. The closer the arc is to the second fin block 5, the more it has a shape similar to the shape of the second fin block 5 so as to snugly fit said arc. Thus, the arc 10 closest to the second fin block 5 is sectioned by the various fins 100 at the same time as it propagates.

The contactor 30 includes a wall 31 to prevent gases or particles escaping from the break chamber. The contactor 30 also includes a movable rod 32 and an assertion spring 33. The movable bridge 2 is normally open, namely the rest position of the movable bridge 2 is distant from the fixed contacts 1. Of course, the movable bridge 2 can also be normally closed, namely in the rest position, the movable bridge 2 is in contact with the fixed contacts 1.

FIG. 7 shows a cross-sectional view of a contactor break chamber 30 representing the first electric arc 9 and the second electric arc 10. The first arc 9 is sectioned by the fins 100 of the first fin block 4. The second arc 10 is sectioned by the fins 100 of the second fin block 5.

The invention claimed is:

1. A double-break contactor comprising:

a movable bridge being movable between a closed state and an open state, comprising a first movable contact and a second movable contact, and, a first fixed contact facing the first movable contact and a second fixed contact facing the second movable contact, wherein, in the closed state, the first and second movable contacts are in contact with the first and second fixed contacts respectively and, in the open state, the first and second movable contacts are distant from the first and second fixed contacts respectively, two magnets configured to generate a magnetic field having a constant direction so as to generate a magnetic force to move an arc appearing between the first and second fixed contacts, and the first and second movable contacts of the movable bridge switching from the closed state to the open state, two fin blocks each having:

a first end and a second end, fins between the first end and the second end of each fin block, and a first and a second extinction zone each formed by the fins of each fin block, four arc guides running from the movable contacts of the bridge to the two fin blocks, wherein fin notches forming a groove of fin blocks among the fins of each of the two fin blocks face each corresponding arc guide, and wherein the contactor further comprises four arc guides each running from one of the first and second fixed contacts to one of the two fin blocks respectively.

2. The contactor according to claim 1, wherein the four arc guides running from the movable contacts and the four arc guides running from one of the corresponding fixed contacts, are independent of one another, four arc guides are branches extending from the movable contacts towards the fin blocks and four arc guides are branches extending from the fixed contacts towards the fin blocks.

3. The contactor according to claim 1, comprising a first and a second fixed contact support electrically insulated from each other respectively supporting the first and second fixed contacts and two of the four arc guides forming a first pair running from the fixed contacts belong to the first fixed contact support and each extend from the first fixed contact towards the fin blocks, and the remaining two of the four arc guides running from the fixed contacts belong to the second fixed contact support and each extend from the second fixed contact towards the fin blocks.

4. The contactor according to claim 3, wherein the four arc guides running from the fixed contacts are surfaces of the first and second fixed contact supports running from the fixed contacts to the fin blocks.

5. The contactor according to claim 1, wherein one pair of arc guides of the four arc guides running from the movable contacts, is a plate comprising a first and a second arc guide bonded to a base, the first and second arc guides each extending in a direction between the first and second movable contacts respectively of the bridge towards the corresponding fin block.

6. The contactor according to claim 5, wherein the fins of each fin block each comprise two portions of two distinct extinction zones of each fin block, each of the two portions comprising a groove and wherein for the pair of arc guides and a second pair of arc guides, first and second, arc guides extend from the base of an arc guide plate towards the corresponding groove of the fins of the fin blocks.

7. The contactor according to claim 1, wherein the four arc guides extending from the movable contacts are connected into an assembly, the assembly is a plate comprising four arc guides bonded to a base, each arc guide extends from the movable contacts towards the fin blocks.

8. The contactor according to claim 1, wherein each fin of the fin block comprises a receiving surface and wherein some of the receiving surface of the fins are offset towards the fixed contact with respect to other receiving surfaces aligned in a same plane.

9. The contactor according to claim 1, wherein each arc guide is fixed to the first end of one of the two fin blocks.

* * * * *